United States Patent [19]
Hara

[11] Patent Number: 5,406,614
[45] Date of Patent: Apr. 11, 1995

[54] ZONE REGISTRATION OF A MOBILE IN A MOBILE TELEPHONE SYSTEM

[75] Inventor: Toshihiro Hara, Tokyo, Japan

[73] Assignee: NEC Corporation, Tokyo, Japan

[21] Appl. No.: 11,736

[22] Filed: Feb. 1, 1993

[30] Foreign Application Priority Data

Feb. 21, 1992 [JP] Japan .................. 4-033846

[51] Int. Cl.⁶ ........................................ H04M 11/00
[52] U.S. Cl. ........................................ 379/59; 379/60;
379/63; 379/61; 455/33.1; 455/33.2
[58] Field of Search ........................ 379/58, 59, 60, 61,
379/63; 455/33.1, 33.2, 54.1, 54.2, 56.1

[56] References Cited

U.S. PATENT DOCUMENTS

| | | | |
|---|---|---|---|
| 4,833,702 | 5/1989 | Shitara et al. | 379/60 |
| 4,879,740 | 11/1989 | Nagashima et al. | 379/60 X |
| 4,926,421 | 5/1990 | Kawano et al. | 455/33.2 X |
| 5,111,535 | 5/1992 | Tokunaga | 379/60 X |

*Primary Examiner*—Curtis Kuntz
*Assistant Examiner*—G. J. Oehling
*Attorney, Agent, or Firm*—Sughrue, Mion, Zinn, Macpeak & Seas

[57] ABSTRACT

In a service area of a mobile telephone system, there are plural base radio stations. A mobile radio station in the service area broadcasts a request signal of zone registration. All the base stations in the service area receive this request signal, measure the field intensity of the signal, and transmit the value of the measured intensity to the mobile radio station. The mobile radio station transmits a response signal to a base radio station where the field intensity is the highest. This response signal is reported to a radio channel control unit where the contents of the zone register is revised in accordance with the reported response.

2 Claims, 4 Drawing Sheets

3: BASE RADIO STATION

4: RADIO TELEPHONE

ZONE REGISTRATION OF A MOBILE IN A MOBILE TELEPHONE SYSTEM

BACKGROUND OF THE INVENTION

This invention relates to a mobile telephone system, and more particularly to a process of zone registration of a mobile radio station in the system.

In a service area for a mobile radio station, there are plural base radio stations, and the mobile radio station is connected to a desired telephone subscriber through one of these base radio stations, a radio channel control unit, and a private exchange equipment(PBX). One radio channel control unit is provided in common in a service area and controls all the base radio stations in the service area. An area where a base radio station connects a mobile radio station in the area to a telephone subscriber is called a service zone or simply a zone of the base radio station.

For smooth operation of originating and receiving calls in this system, the radio channel control unit which controls the entire system, must remember the identifications of all the mobile radio stations in connection with the identifications the service zones to which they belong. And each mobile radio station must remember the identification of the zone of the station and must originate a call to the base radio station in the zone.

Thus, zone registration of mobile radio stations is carried out in this system, and there have been two different modes of zone registration in systems heretofore known. One mode of zone registration is carried out manually at an initialization, and the other mode of zone registration is carried out automatically and periodically.

At an initialization, a mobile radio station transmits a request signal of registration including the identification signal of the station on a radio channel. This request signal is received at plural base radio stations in the service area. Each base radio station which receives this request signal measures the field intensity of the request signal and reports the measured field intensity to the radio channel control unit through a cable laid between the base radio station and the radio channel control unit. The radio channel control unit compares the values of the field intensities measured at the base radio stations and chooses a service zone having the highest field intensity for the mobile radio station as the zone of the mobile radio station. The radio channel control unit registers this decision in a zone register, and notifies this decision to a base radio station whose service zone is registered as the zone of the mobile radio station. The base radio station notified by the radio channel control unit communicates the decision to the mobile radio station, where this decision is registered in a zone register of the mobile radio station.

In an automatic registration mode, all the base radio stations, controlled by the radio channel control unit, broadcast, periodically and in time division, a zone signal including the identification signal and followed by a battery saving signal.

For the sake of saving battery consumption in a mobile radio station, the receiver of the mobile radio station is power-supplied only intermittently in a standby mode. When a signal is received in this intermittent receiving mode, the receiver is continuously power-supplied and receives the transmitted message. When the battery saving signal is received at the end of the message, the receiver returns to the standby mode.

A mobile radio station receives the zone signals from all the base radio stations in a time sharing sequence, and measures the field intensity of these zone signals. If the zone signal which have the highest field intensity is not from a base radio station which is registered in the zone register of the mobile radio station, the mobile radio station automatically transmits a request signal to the base radio station having the highest field intensity. The base radio station which receives this request signal from the mobile radio station reports the signal to the radio channel control unit, and the contents of the zone register in the radio channel control unit is revised in accordance with the report.

As described in the foregoing paragraphs there have been two modes of zone registration, and in an automatic mode, each mobile radio station must be equipped with a field intensity meter. For the two modes of operation, two control programs are required. This makes the control program and control itself complex. The field intensity meter is made up of a simple circuit in a radio receiver, but it makes the total cost of the system higher to provide field intensity meters and automatic control circuits related to the field intensity meters for all the mobile radio stations.

SUMMARY OF THE INVENTION

Therefore, an object of the present invention is to provide a mobile telephone system in which a single process is employed for zone registration in different occasions, simplifying the controls of registration. And another object of this invention is to eliminate the necessity of field intensity measurement in a mobile radio station.

According to the present invention, a mobile radio station in a service area transmits a request signal whenever the station thinks it necessary. Each base radio station which receives this request signal, measures the field intensity of the signal and transmits the measured field intensity to the mobile radio station. At the mobile radio station the values of the field intensities at the base stations are compared, and a zone having a highest field intensity is selected as a zone to which the mobile radio station belongs. Then, the mobile radio station notifies this selection to a base radio station corresponding to the selected zone. The selected and notified base radio station reports this selection to the radio control unit by a zone registration signal. The radio channel control unit revises the contents of the zone register in the control unit and sends a registration finished signal to the mobile radio station through the base radio station.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
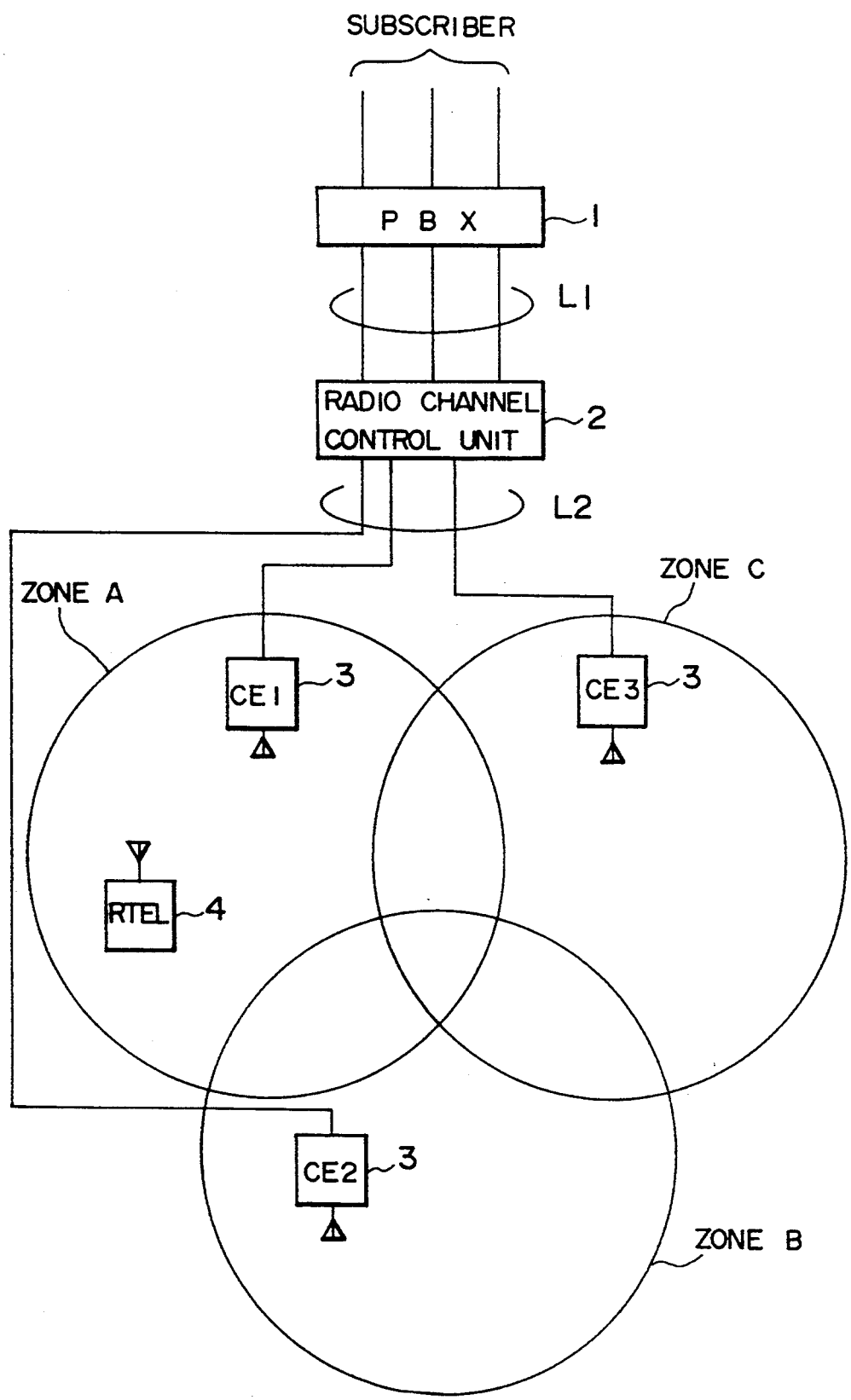
FIG. 1 shows a block diagram of a mobile telephone system of an embodiment of this invention.

Referring to FIG. 1, a mobile radio station 4(RTEL) is connected to a desired telephone subscriber through one of base radio stations 3(CEs), a common radio control unit 2, and a private branch exchange equipment 1(PBX). There are plural mobile radio stations 4 and plural base radio stations 3, and a mobile radio station 4(RTEL) and three base radio stations 3(CE1, CE2, CE3) are shown in FIG. 1.

Figure 2:
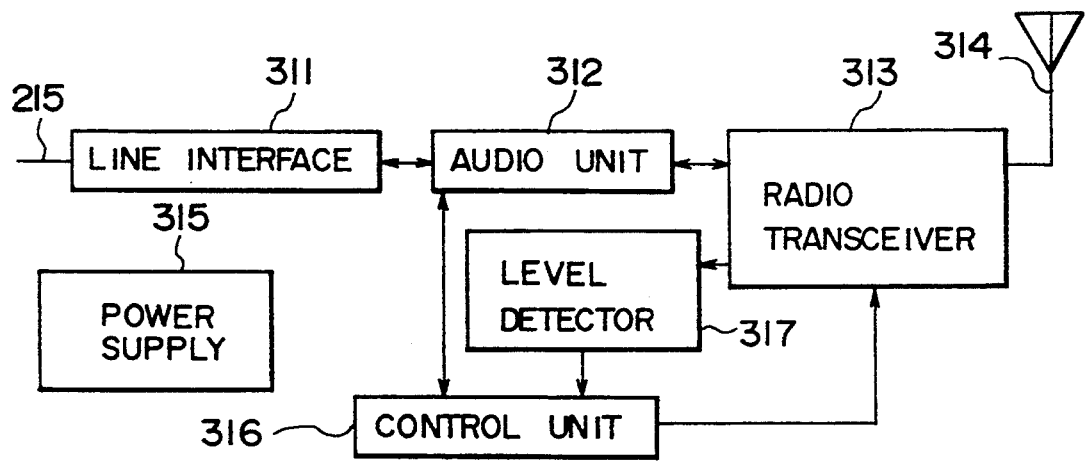
FIG. 2 shows a block diagram of a base radio station in FIG. 1.

As shown by a block diagram of FIG. 2, a base radio station in FIG. 1 comprises a line interface 311, an audio unit 312, a radio transceiver 313, an antenna 314, a power supply 315, a control unit 316, and a level detector 317. Voice signals and control signals to and from the radio channel control unit 2 are transmitted by a cable 215.

Figure 3:
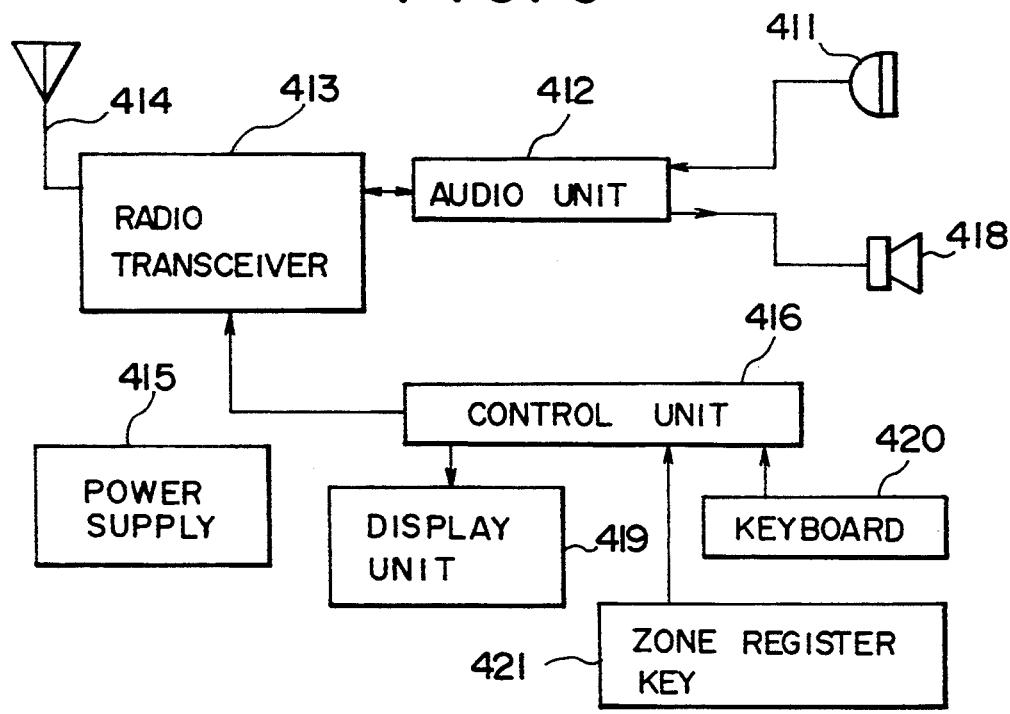
FIG. 3 shows a block diagram of a mobile radio station in FIG. 1.

And as shown by a block diagram of FIG. 3, the mobile radio station 4 in FIG. 1 comprises a microphone 411, an audio unit 412, a radio transceiver 413, an antenna 414, a power supply 415, a control unit 416, a speaker 418, a display unit 419, a keyboard 420, and a zone register key 421.

Figure 4:
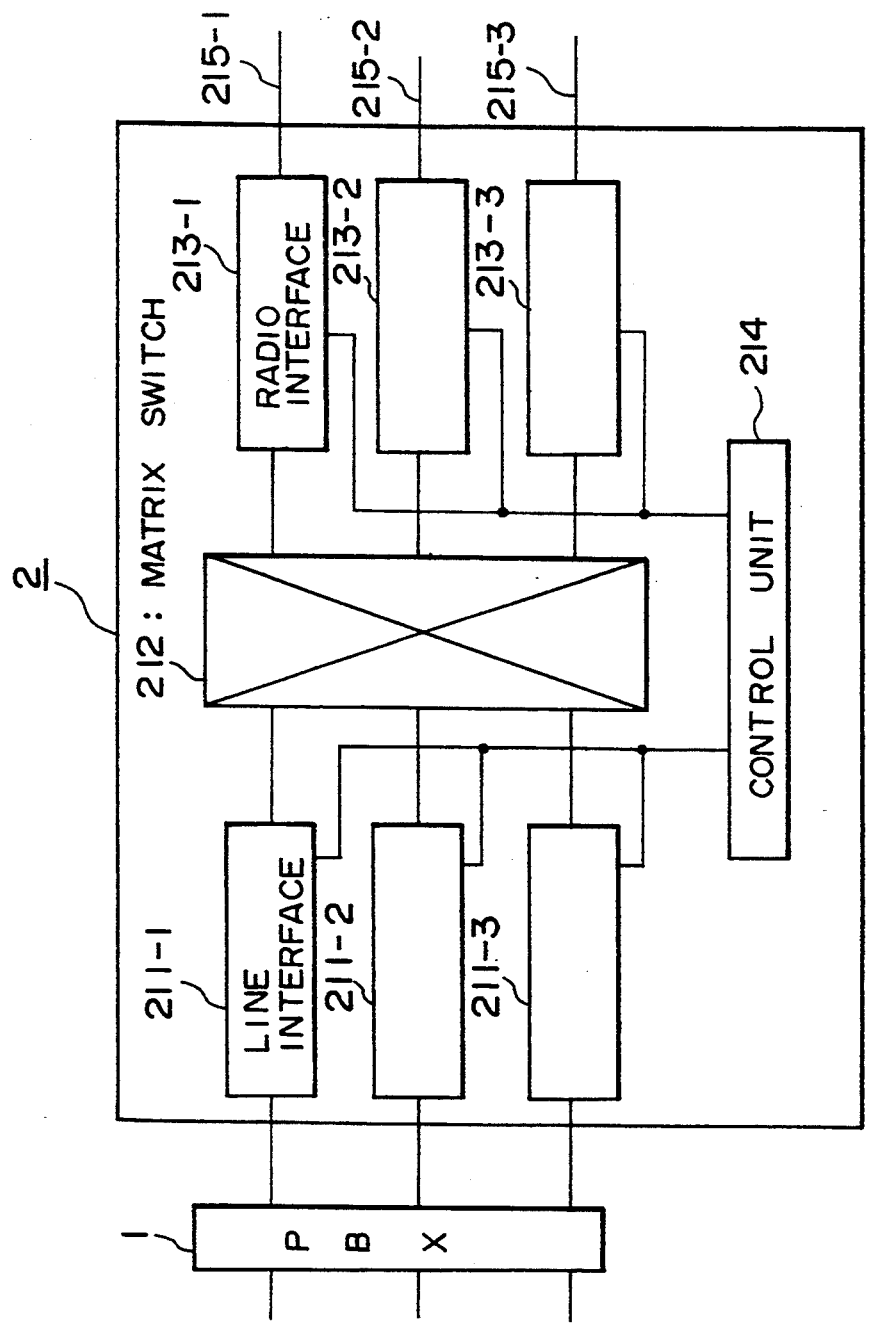
FIG. 4 shows a block diagram of the radio channel control unit in FIG. 1.

The radio control unit 2 in FIG. 1 comprises, as shown in FIG. 4, line interfaces 211 for interfacing the lines to the PBX 1, radio interfaces 213 for interfacing the lines 215 to base radio stations 3, a matrix switch 212 for switching between the line interfaces 211 and the radio interfaces 213, and a control unit 214.

Figure 5:
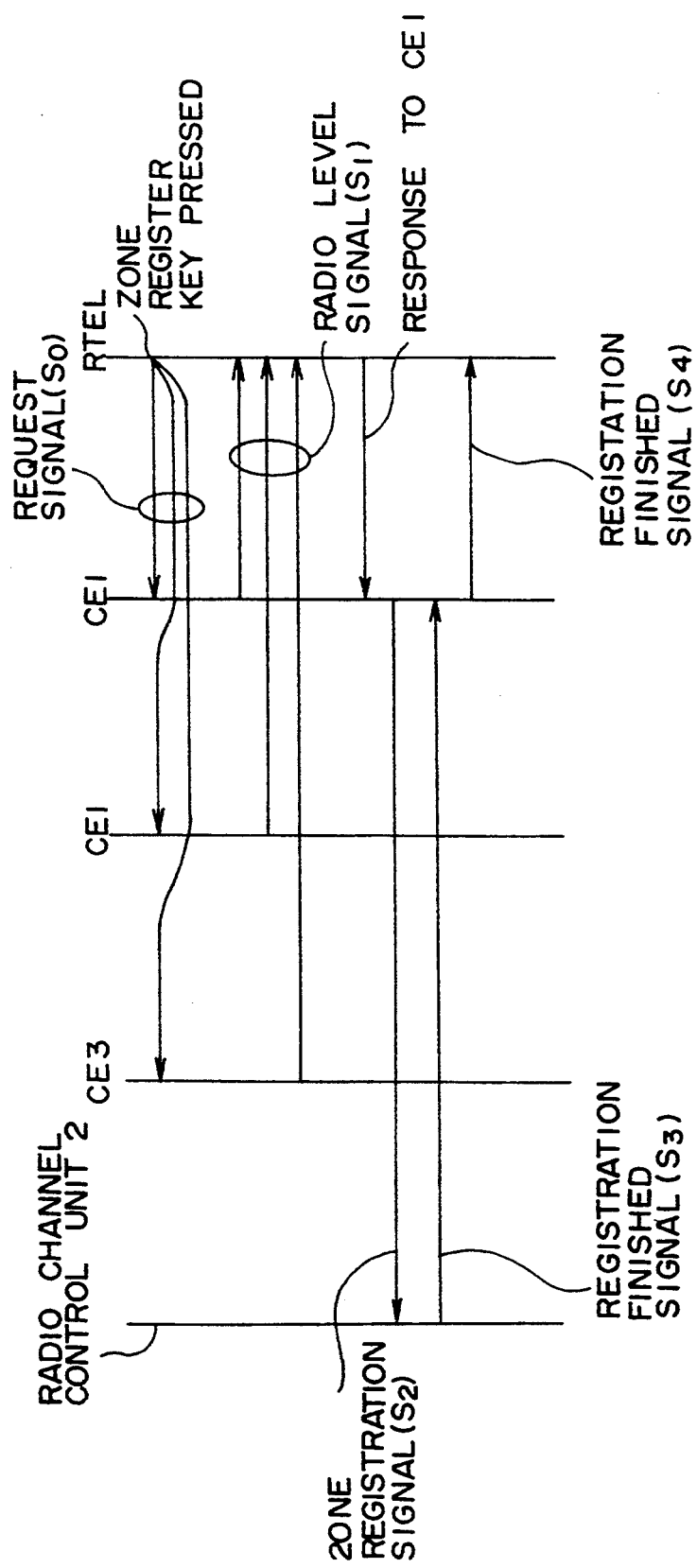
FIG. 5 shows a protocol of communication in an embodiment of this invention.

Referring now to FIG. 5, a zone registration process of this invention is described. At a mobile radio station 4(RTEL), the operator presses the zone register key 421 whenever he requests zone registration. A request signal($S_0$) including the identification signal, controlled by the control unit 416, is broadcasted from the antenna 414. This request signal is received by all the base radio stations CE1, CE2, and CE3. At each base radio station 3, the field intensity of the signal is measured by the level detector 319. For example, an automatic gain control(AGC) voltage in the radio transceiver 313 represents the field intensity and the level detector 317 converts the AGC voltage to a digital data.

This digital data which is called a radio level signal($S_1$) is transmitted to the mobile radio station from each base radio station in a time division system.

The mobile radio station 4 receives radio level signals($S_1$) from all the base radio stations 3 and compares these signals. A zone laving the highest level signal is to be selected as the zone of the mobile radio station. Suppose that the radio level signal from the base radio station CE1(in zone A) is the highest. The mobile radio station 4 transmits a response signal to the base radio station CE1.

Upon receiving the response signal from the mobile radio station 4, the base radio station CE1 reports to the radio channel control unit 2 by a zone registration signal $S_2$ that the mobile radio station RTEL belongs to zone A. The radio channel control unit 2 revises the contents of its zone register according to the report of the base radio station CE1.

After this revision of the zone register, the radio channel control unit 2 notifies the finish of the zone registration to the base radio station CE1 by a registration finished signal($S_3$).

When the base radio station CE1 receives the registration finished signal($S_3$) from the radio channel control unit 2, the base radio station CE1 relays this signal to the mobile radio station RTEL as a registration finished signal($S_4$).

When the mobile radio station RTEL receives this registration finished signal($S_4$) the mobile radio station revises the contents of its zone register.

As described in the foregoing paragraphs, the process shown in FIG. 5 can be applied at an initial zone registration of a mobile radio station as well as at a change of service zone for a mobile radio station, and does not require a field intensity meter in a mobile radio station.

What is claimed is:

1. A mobile telephone system comprising:
   a plurality of base radio stations,
   each of said plurality of base radio stations having a service zone in which said base radio station connects a mobile radio station in said service zone to a telephone subscriber;
   at least one mobile radio station;
   a common radio channel control unit for controlling all of said plurality of base radio stations;
   cables connecting said radio channel control unit with each of said plurality of base radio stations;
   telephone lines connecting said radio channel control unit to a desired telephone subscriber through private branch exchange equipment;
   a zone register provided in said radio channel control unit for storing identifications of all said mobile radio stations in association with identifications of the service zones to which said mobile radio stations belong;
   means for broadcasting a request signal of zone registration from a first transceiver in said mobile radio station;
   means for receiving said request signal by second transceivers in each of said plurality of base radio stations;
   signal strength detectors provided in each of said plurality of base radio stations for measuring respective field intensities of said request signal, wherein said signal strength detectors comprise an analog to digital converter for converting an analog voltage corresponding to said field intensity to a digital signal;
   means for transmitting to said mobile radio station said measured values of said respective field intensities;
   means for comparing at said mobile radio station the measured values of said respective field intensities and determining a highest measured value of received measured values of said respective field intensities;
   means for transmitting a response signal from said mobile radio station to a selected base radio station, the selected base radio station being that one of said plurality of base radio stations that has transmitted the highest measured value to said mobile radio station;
   means for reporting said response signal from said selected base radio station to said radio channel control unit; and
   means for revising contents of said zone register in said radio channel control unit in accordance with said response signal, wherein a signal indicating completion of said revision of contents of said zone register in said radio channel control unit is transmitted from said radio channel control unit for reception by said mobile radio station.

2. A mobile telephone system according to claim 1, wherein said request signal includes an identification of said mobile radio station.

* * * * *